United States Patent [19]

Cronenberger et al.

[11] 3,930,070

[45] Dec. 30, 1975

[54] COATING PROCESS USING A FLUIDISABLE POWDER COMPRISING A HEAT-STABLE BISIMIDE RESIN AND PARTICLES OF GLASS OR MICA

[75] Inventors: Michel Cronenberger, Lyon; Serge Laurent, Bron; Maurice Mallet, Lyon, all of France

[73] Assignee: Rhone-Poulenc, S.A., Paris, France

[22] Filed: Apr. 19, 1972

[21] Appl. No.: 245,670

Related U.S. Application Data

[62] Division of Ser. No. 91,610, Nov. 20, 1970, abandoned.

[30] Foreign Application Priority Data

Nov. 24, 1969 France .............................. 69.40392
Oct. 1, 1970 France .............................. 70.35524

[52] U.S. Cl. ................ 427/185; 427/195; 427/201; 428/324; 428/325; 428/474
[51] Int. Cl.² .... B05D 1/24; B05D 1/36; B05D 3/00
[58] Field of Search......... 117/21, 26, 132 B, 135.1, 117/161 UA, 161 UN, DIG.6, 104; 260/37 N, 47 CZ, 78 TF; 427/185, 195, 201; 428/324, 325, 474

[56] References Cited
UNITED STATES PATENTS

| | | | |
|---|---|---|---|
| 2,997,776 | 8/1961 | Matter et al. .................... | 117/21 X |
| 3,037,885 | 6/1962 | Abolins............................. | 117/7 X |
| 3,045,709 | 7/1962 | Rapp................................. | 117/21 X |
| 3,090,696 | 5/1963 | Gemmer............................ | 117/21 |
| 3,260,691 | 7/1966 | Lavin et al......................... | 260/30.2 |
| 3,287,311 | 11/1966 | Edwards ........................... | 260/37 N |
| 3,338,863 | 8/1967 | Haag.................................. | 117/21 X |
| 3,351,504 | 11/1967 | De Hart............................. | 117/21 X |
| 3,416,994 | 12/1968 | Chalmers et al. .......... | 117/161 UA X |
| 3,442,703 | 5/1969 | Naselow............................. | 117/232 |
| 3,562,223 | 2/1971 | Bargain et al. ................... | 260/78 TF |
| 3,632,428 | 1/1972 | Lubowitz et al. ................. | 117/21 X |
| 3,651,012 | 3/1972 | Gerow ............................... | 51/298 |
| 3,661,673 | 5/1972 | Merriam ........................... | 117/16 |
| 3,679,639 | 7/1972 | Bargain et al. ............... | 260/47 CZ X |
| 3,712,932 | 1/1973 | Balme et al. ..................... | 260/78 TF |
| 3,717,615 | 2/1973 | Holub et al. ................ | 260/47 CZ X |

FOREIGN PATENTS OR APPLICATIONS

| | | | |
|---|---|---|---|
| 31,182 | 2/1961 | Finland............................... | 117/33 |
| 987,422 | 2/1963 | United Kingdom............ | 117/DIG. 6 |
| 220,363 | 6/1957 | Australia........................... | 117/DIG. 6 |
| 211,584 | 6/1957 | Australia........................... | 117/DIG. 6 |

*Primary Examiner*—Michael Sofocleous
*Attorney, Agent, or Firm*—Stevens, Davis, Miller & Mosher

[57] ABSTRACT

A process for providing coatings having high temperature and crack resistance by dipping the article to be coated in a fluidized bed containing a fluidisable powder made from particles having dimensions between 5 and 200 microns and comprising a mixture of prepolymer derived from N,N'-bisimides of an unsaturated carboxylic acid and diprimary diamines and of glass micro-spheres and/or mica particles. The article to be coated can also be sprayed with the fluidisable powder rather than using the fluidized bed technique.

27 Claims, No Drawings

COATING PROCESS USING A FLUIDISABLE POWDER COMPRISING A HEAT-STABLE BISIMIDE RESIN AND PARTICLES OF GLASS OR MICA

This is a division of application Ser. No. 91,610, filed Nov. 20, 1970 and now abandoned.

THIS INVENTION relates to a fluidisable powder based on a heat-stable resin, which powder provides coatings capable of withstanding high temperatures over long periods of time without shrinking and cracking.

According to the present invention there is provided a fluidisable powder in the form of particles of dimensions between 5 and 200μ, consisting of a mixture comprising, by weight:

5 to 95 percent of a prepolymer obtained by heating at between 50° and 250°C, for several minutes to several hours, an N,N'-bis-imide of an unsaturated dicarboxylic acid, of general formula

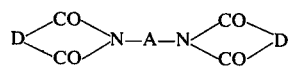

(I)

in which D represents a divalent radical containing a carbon-carbon double bond and A represents a divalent radical possessing 2 to 30 carbon atoms, and a di-primary diamine of general formula:

$$H_2N—B—NH_2$$

(II)

in which B represents a divalent radical possessing 2 to 30 carbon atoms, and 95 to 5 percent of glass micro-spheres and/or of mica.

The term "glass micro-sphere" as used herein denotes any glass particle which does not possess sharp edges; it thus includes particles of regular shape (spheroid, ellipsoid or ovoid) and irregular shape, but with rounded angles; these shperes may be solid or hollow. The average size of the glass spheres is less than 200μ, generally between 5 and 100μ.

The different varieties of mica including muscovite, biotite, phlogopite, lepidolite, sericite, paragonite, lepidomelane, zinwaldite, roscoelite and vermiculite can be used; the particle dimensions of these should generally be between 1 and 150μ, preferably between 1 and 20μ.

Preferably, the proportion of prepolymer is between 30 and 70 percent by weight.

The symbol D represents a radical derived from an anhydride of an ethylenic dicarboxylic acid, of general formula:

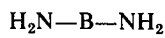

(III)

Examples of such anhydrides are maleic anhydride, citraconic anhydride, itaconic anhydride, pyrocinchonic anhydride and dichloromaleic anhydride, as well as the Diels-Alder reaction products of one of these anhydrides with an acyclic, alicyclic or heteroxyclic diene, such as tetrahydrophtalic anhydride and endomethylene tetrahydrophtalic anhydride. With regard to the anhydrides obtained by Diels-Alder reaction reference may be made to Volume IV of "Organics Reactions" (John Wiley & Sons, Inc.).

The symbols A and B may be identical or different and, may for example, represent a linear or branched alkylene radical with less than 13 carbon atoms, a phenylene or cyclohexylene radical or a

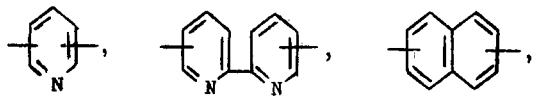

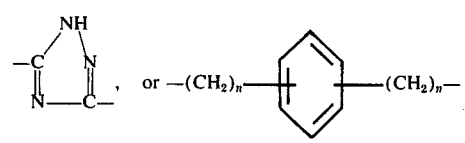

radical wherein $n$ represents an integer from 1 to 3. The symbols A and B can also represent several phenylene or cyclohexylene radicals joined to one another by a simple valency bond or by an inert atoms or group such as —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO—, or

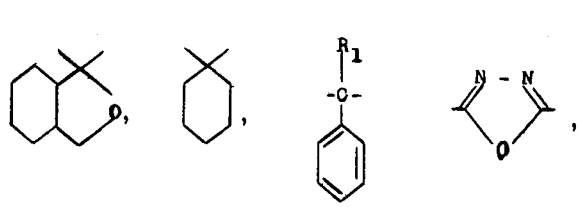

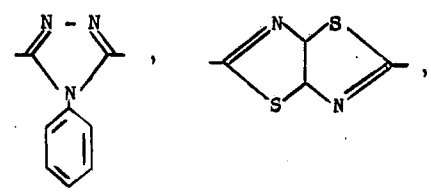

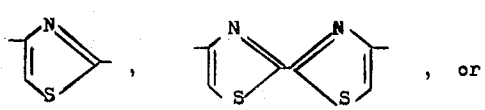

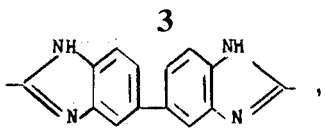

wherein $R_1$ represents a hydrogen atom, a lower alkyl radical with 1 to 4 carbon atoms, or a phenyl or cyclohexyl radical, and X represents an alkylene radical with less than 13 carbon atoms. The various phenylene or cyclohexylene radicals can be substituted by methyl groups.

The following specific examples of bis-imides (I) may be given: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide. N,N'-4,4'-diphenylether-bis-maleimide, N,N'-4,4'-diphenylsulphone-bis-maleimide, N,N'-4,4'-dicyclohexylmethane-bis-maleimide, N,N'-α, α'-4,4'-dimethylenecyclohexane-bis-maleimide, N,N'-meta-xylylene-bis-maleimide, N,N'-para-xylylene-bis-maleimide, N,N'-4,4'-diphenyl-cyclohexane-bis-maleimide, N,N'-meta-phenylene-bis-tetrahydrophthalimide, N,N'-4,4'-diphenylmethane-bis-citraconimide, N,N'-4,4'-diphenyl-1,1-propane-bis-maleimide, N,N'-4,4'-triphenyl-1,1,1-ethane-bis-maleimide, N,N'-4,4'-triphenylmethane-bis-maleimide and N,N'-3,5-triazole, 1,2,4-bis-maleimide.

These bis-imides can be prepared by, for example, following the procedure described in U.S. Pat. No. 2,444,536 for the preparation of N-aryl-maleimides.

Suitable diamines which can be used for the preparation of the prepolymer include 4,4'-diamino-dicyclohexylmethane, 1,4-diamino-cyclohexane, 2,6-diaminopyridine, meta-phenylenediamine, para-phenylenediamine, 4,4'-diamino-diphenylmethane, 2,2-bis(4-aminophenyl)-propane, benzidine, 4,4'-diaminophenyl ether, 4,4'-diaminophenyl sulphide, 4,4'-diamino-diphenylsulphone, bis(4-aminophenyl)-methylphosphine oxide, bis(4-aminophenyl)phenylphosphine oxide, N,N-bis(4-aminophenyl)methylamine, 1,5-diaminonaphthalene, meta-xylylenediamine, para-xylylenediamine, 1,1-bis(para-aminophenyl)phthalane, hexamethylenediamine, 6,6'-diamino-2,2'-dipyridyl, 4,4'-diamino-benzophenone, 4,4'-diaminoazobenzene, bis(4-aminophenyl)phenylmethane, 1,1-bis(4-aminophenyl)-cyclohexane, 1,1-bis(4-amino-3-methylphenyl)-cyclohexane, 2,5-bis(m-aminophenyl)1,3,4-oxadiazole, 2,5-bis(p-aminophenyl)-1,3,4-oxadiazole, 2,5-bis(m-aminophenyl)-thiazolo(4,5-d)thiazole, 5,5'-di(m-aminophenyl)-(2,2')-bis(1,3,4-oxadiazolyl), 4,4'-bis(p-aminophenyl)-2,2'-dithiazole, m-bis(4-p-aminophenyl)-2-thiazolyl-bonzene, 2,2'-bis(m-aminophenyl)-5,5'-dibenzimidazole, 4,4'-diamino-benzanilide, phenyl-4,4'-diaminobenzoate, N,N'-bis(4-aminobenzoyl)-p-phenylenediamine, 3,5-bis(m-aminophenyl)-4-phenyl-1,2,4-triazole, 4,4'-N,N'-bis(p-aminobenzoyl)diamino-diphenylmethane, bis-p-(4-aminophenoxycarbonyl)-benzene, bis-p-(4-aminophenoxy)benzene, 3,5-diamino-1,2,4-triazole and 1,1-bis(4-aminophenyl)1-phenylethane.

The amounts of N,N'-bis-imide and of diamine are preferably so chosen that the ratio
number of mols of N,N'-bis-imide (I)/number of mols of diamine (II)
is between 1.1 and 50. Preferably, the reaction product of N,N'-4,4'-diphenylmethane-bis-maleimide and 4,4'-diamino-diphenylmethane in a molar ratio ff between 1.2:1 and 5:1, is used.

The prepolymer is obtained by heating the imide and the diamine under the conditions indicated above. The preparation can be carried out in solution in an inert polar diluent such as dimethylformamide, N-methylpyrrolidone-2 or dimethylacetamide, or in the absence of a solvent.

It is also possible to combine the prepolymer and the abovementioned fillers (spheres of glass and/or mica) with upgrading fillers compatible with the prepolymer and capable of withstanding high temperatures. These upgrading fillers can impart special properties to the powder and to the coating as follows:

pigmentation: for this purpose, finely divided inorganic pigments can be used, such as zinc oxide and sulphide, titanium dioxide, lithopone, chromic oxide and iron oxide pigments.

fireproofing: polyphenyls can, in particular be used, especially chlorinated polyphenyls and/or antimony oxides.

It is also possible to add to the composition:

flow inhibitors, i.e. products intended to raise the viscosity of the fused powder during coating and to prevent the formation of drips: as examples of such agents, magnesium oxide, aluminium silicate, calcium meta-silicate, barium sulphate and aluminium oxide may be quoted;

agents which promote the spreading of the fused powder over the base article: examples of such compounds include, silica, calcium and magnesium double carbonate, and organosilicon resins such as methylpolysiloxane, phenylpolysiloxane and methylphenylpolysiloxane resins.

It is also possible to use, by themselves or mixed with the preceding compounds, epoxide resins such as those originating from the reaction of epichlorhydrin with 2,2-bis(para-hydroxyphenyl)propane, having an epoxide equivalent weight of between 170 to 4000. By "epoxide equivalent weight" is meant the weight of resin, expressed in grams, containing one gram equivalent of epoxide. It is also possible to use resins of average formula

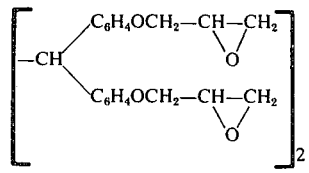

having an epoxide equivalent weight of between 200 and 220; and agents which improve the adhesion to metals, for example trimellitic acid.

The proportion of the various supplementary fillers enumerated above can by way of indication, amount to 50 percent, and is preferably for 3 to 20 percent, of the weight of the mixture of prepolymer and spheres of glass and/or mica. If such fillers are employed, the proportion of prepolymer is preferably at least 15 percent of the weight of the mixture of prepolymer and spheres of glass and/or mica.

The powder of this invention can be obtained by intimately bringing together its various constituents. Thus, the propolymor, prepared separately and ground, can simply be mixed with the fillers. According to a preferred technique, it is possible to carry out the prepolymerisation in the presence of the spheres of glass and/or mica and even, where appropriate, of the supplementary unreactive fillers, and to grind the resulting mixture. This technique facilitates mixing and imparts a high surface uniformity to the finished article or coating.

The powders of this invention are very suitable for coating high temperature-resistant articles by fluidistation; such articles may be metallic, for example copper, steel or aluminium, or non-metallic such as graphite, oxides and ceramics, and may be of various shaped including wires, small slabs and tubes used in various fields, especially the electronic and electrical industry. For ease of operation, it is preferred that at least 80 percent of the powder particles have a diameter of between 60 and 120$\mu$.

Whilst it is not essential to subject the article to be coated to any prior treatment, it has been found that articles having a high impact resistance coating can be obtained if the carrier is treated beforehand with a polytrimellamide-imide resin.

The polytrimellamide-imide resin is generally employed in the form of a solution in a polar non-hydroxylic organic solvent, such as N-methylpyrrolidone-2, dimethyl-formamide, dimethylacetamide dimethylsulphoxide or N-methylcaprolactam, or a mixture of one of these solvents with a hydrocarbon, in particular an aromatic hydrocarbon such as xylene.

Amongst the trimellamide-imides which can be used, in these resins, there may be mentioned in particular those which are obtained from trimellitic anhydride and a difunctional derivative of general formula

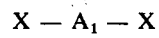

(IV)

in which $A_1$ represents a divalent radical containing at least one benzene nucleus, such as m-phenylene, p-phenylene, p,p', diphenylene or

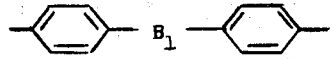

in which $B_1$ represents a divalent group such as —O—, —CH$_2$—, —C(CH$_3$)$_2$— or —SO$_2$— and the symbol X represents an —NCO group or a group of formula —NHCOR, in which R represents an alkyl radical with 1 to 6 carbon atoms or a phenyl or methylphenyl radical.

It is advantageous to prepare the trimellamideimide in the solvent chosen for using the resin.

The preparation of the polytrimellamide-imide resins has been extensively described in the literature and it is possible to use resins obtained according to the processes described, for example, in the following: British Patent Nos. 570,858 and 1,181,446, U.S. Pat. No. 3,260,691; and French Pat. Nos. 1,386,617, 1,473,600, 1,501,198, 1,559,357 and 1,576,844. The viscosity of the polytrimellamide-imide solutions used for the prior treatment of the articles to be coated is generally between 1 and 50 poises at 25°C. Amongst these solutions, preference is given to those wherein the trimellamide-imide has a reduced viscosity of between 30 and 180 cm$^3$/g. (measured as an 0.5 percent strength solution in N-methylpyrrolidone). Solutions in N-methylpyrrolidone in which the trimellamide-imide is derived from 4,4'-diisocyanato-diphenylmethane or 4,4'-diisocyanato-diphenylether are particularly suitable.

The pretreatment of the articles to be coated can be effected by simple immersion of the article in the trimellamide-imide resin solution; it is also possible to follow a different procedure, for example by spreading the solution over the article by means of a brush, or by spraying the solution. It is then necessary to remove the solvent; this removal can generally be effected by heating (for several seconds to several minutes) at a temperature of between 100° and 250°C.

The coating of the article with the powder of this invention can be effected by dipping the article to be coated, which may or may not have undergone the pretreatment described above, heated to a temperature above the melting point of the prepolymer, generally above 130°C. and referably 170° to 250°C., for several seconds into a tank containing the fluidised powder. It can also be carried out by spraying the powder onto the hot article, for example with an electrostatic gun. If this second technique is employed, it is desirable to limit the maximum particle size of the powder to 80$\mu$.

After stoving the propolymer (suitably for 10 minutes to 2 hours at between 150° and 300°C.), the coated article can be cooled either in still air or by means of an air blast, or by immersion in water at ambient temperature.

The coatings obtained using the powders of this invention generally show excellent adhesion to their support, especially when this is metallic, and can withstand prolonged exposure to high temperature (several thousands of hours at 200°C.) without cracking.

The following Examples further illustrate the present invention.

EXAMPLE 1

114.6 g. of N,N'-4,4'-diphenylmethane-bis-maleimide, 25.4 g. of bis(4-aminophenyl)methane and 210 g. of glass microspheres of diameter between 4 and 44$\mu$, coated with an adhesion primer based on aminosilane (marketed by Messrs. Ballotini under the name "Glass Micro-spheres Type 3000") were introduced into a tank equipped with a stirring device and heated over a metal bath. The whole was heated to 165°–170°C. for 9 minutes 30 seconds in order to effect the propolymerisation.

Thereafter the mixture was cast onto a cold plate and, after cooling, was introduced into a grinder to yield a powder (P) of particle size less than 150$\mu$.

The articles to be coated were either small steel slabs of size 40 × 40 × 3 mm or steel wires of diameter 3 mm.

The fluidisation device consists of a vertical 150 mm high aluminium tube of 100 mm diameter, equipped in its lower part with a porous polyethylene plate and an air inlet, the air flow rate being adjusted so as to give an expansion of the fluidised bed of about 50 percent.

Five specimens of each type were heated for 20 minutes in an oven at 220°C. and then dipped into the fluidised bath for 3 to 4 seconds. After stoving for 20 minutes at 200°C. in a ventilated oven, the specimens were allowed to cool in ambient air.

The coating was smooth and homogeneous and showed no crazing whatsoever. The specimens were thereafter introduced into a ventilated oven at 200°C. to study the heat stability; after 7600 hours, no crazing whatsoever was yet observable.

Three other specimens, coated with the same composition and in accordance with the same technique, were subjected to a heat stability test at 250°C. After 1600 hours, no cracking whatsoever was yet observable on any of the specimens.

EXAMPLES 2 AND 3

Example 1 was repeated, introducing into the powder (P) 10 percent, based on the weight of this powder, of the fillers indicated below.

The specimens were coated in the same manner and the surface appearance of these specimens was noted; a heat stability test such as described in Example 1 was also carried out.

The supplementary fillers used were as follows:
filler a: fluidisable powder (particle size: <100μ) consisting of, by weight, 25 percent of titanium dioxide, 63.75 percent of an epoxide resin derived from the reaction of epichlorhydrin with 2,2-bis(4-hydroxyphenyl)propane, having an epoxide equivalent of between 450 and 525, and 11.25 percent of a methoxylated organosilicon resin with R/Si = 1.66 and phenyl/Si = 1.33.
filler b: 50 percent by weight of titanium dioxide, and 50 percent by weight of a methyl-phenylpolysiloxane resin of R/Si ratio = 1.25 and phenyl/Si ratio = 0.625, passing through a 149μ sieve.

After cooling, the surface of the specimens coated with the compositions A : powder (P) + filler a, and B : powder (P) + filler b, were smooth and homogeneous and showed no crazing whatsoever.

In the heat stability test at 200°C., the specimens coated with composition A showed no crazing whatsoever after 2900 hours; the same observation was made on the specimens coated with composition B after 2000 hours.

EXAMPLE 4

A powder (P') was prepared in the same manner as the powder (P) in Example 1, but from 626.7 g. of N,N'-4,4'-diphenylmethane-bis-maleimide, 173.3 g. of bis(4-aminophenyl)methane and 1200 g. of glass micro-spheres.

The propolyerisation was effected by heating to 170°C. for 20 minutes. After grinding, the powder had a particle size of between 60 and 125μ. The powder (P') was mixed with 10 percent by weight of titanium dioxide and five specimens were then coated in accordance with the technique of Example 1. After cooling, the surface of the specimens was smooth, homogeneous and non-crazed. After 1600 hours at 200°C., no change whatsoever in the surface condition of the five specimens was observed.

EXAMPLE 5

Example 1 was repeated, incorporating 2.8 g. of trimellitic acid into the powder.

At 200°, no crazing whatsoever was observed (on 5 specimens) after 5000 hours. At 250°, one specimen out of 4 crazed after 1400 hours.

EXAMPLES 6 AND 7

Example 1 was repeated, replacing the 210 g. of glass spheres, respectively, by 95 g. (powder M) and 35 g. (powder M') of mica (muscovite variety; lamellar particles; 98 percent passing through a 10μ sieve).

In the heat stability test at 200°, no crazing whatsoever was observed after 4300 hours (powders M) and 3300 hours (powder M'). At 250° one of the specimens began to craze after 2000 hours (powders M) and 1700 hours (powders M').

EXAMPLE 8

200 × 50 × 5 mm copper slabs were used, which had beforehand been coated with a trimellamide-imide resin.

The trimellamide-imide resin was prepared as follows:

192 g. of trimellitic anhydride, 250 g. of 4.4'-diisocyanato-diphenylmethane and 1415 g. of N-methylpyrrolidone (NMP) were mixed with stirring. The temperature of the mixture was raised to 140° over 3 hours 30 minutes and then kept at this temperature for 1 hour. The material was cooled and the solution displayed the following characteristics:
 solids content: 28.7 percent
 Brookfield viscosity at 25°: 40 poises.

The polymer has a reduced viscosity of 45 cm$^3$/g. (0.5 percent strength solution in NMP).

In order to coat the small copper slabs, a solution was prepared containing:
 100 g. of the 28.7 percent strength solution of resin in NMP and
 50 g. of a mixture (60/40 by weight) of NMP and xylene.

The resin was applied by immersing the small slabs (for several seconds) in the solution described above, and then drying (2 minutes at 160°C).

The thickness (after drying) of the layer deposited was about 10μ.

The fluidisable powder used contained
 a. 142.8 g. of N,N'-4,4'-diphenylmethane-bis-maleimide
 b. 31.6 g. of bis (4-aminophenyl)methane
 c. 5.6 g. of finely divided pyrogenic silica (particle diameter between 5 and 20 mμ)
 d. 50 g. of the mica used in Example 1 and
 e. 20 g. of terphenyl containing 75 percent by weight of meta isomer and 25 percent of ortho isomer.

The powder was prepared as follows:
The ingredients a, b and e were introduced into a 2 litre tank equipped with a stirring device. The whole was heated to 150°C. and when the contents of the tank reached this temperature, the mica, which had beforehand been dried by heating to 120°C. for 20 minutes, was introduced. Reaction was allowed to take place for 16 minutes at 150°C., and the silica was then added. The mixture was again left at 150°C. for 10 minutes, the stirring was then stopped, and the mixture cast onto an aluminium foil. After cooling, the solid obtained was ground and the particles of size less than 150μ were selected by sieving.

The small slabs of copper coated with the trimellemide-imide resin were preheated to 210°C. for 45 minutes and then dipped (for 3 to 4 seconds) into the tank containing the fluidised powder. Stoving was then carried out for 1 hour 30 minutes at 250°C. in a ventilated oven.

5 specimens were subjected to an impact resistance test, carried out by means of a punch having a spherical end of 10 mm radius, the punch weighing 1 kg. On dropping it from a height of 50 cm no cracking whatsoever was observed.

We claim:

1. A process for coating an article which comprises dipping the article, which is heated to a temperature above the softening point of the prepolymer into a fluidized bed containing a fluidizable powder in the form of particles of dimensions between 5 and 200 μ consisting of a mixture comprising:

a. 5 to 95 percent by weight of a prepolymer obtained by heating at between 50° and 250°C., an N,N'-bisimide of an unsaturated dicarboxylic acid of general formula:

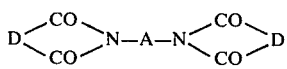 (I)

in which D represents a divalent radical containing a carboncarbon double bond and A represents a divalent radical containing 2 to 30 carbon atoms, and a di-primary diamine of general formula:

 (II)

in which B represents a divalent radical containing 2 to 30 carbon atoms, and b. 95 to 5 percent by weight of particles selected from glass micro-spheres, mica particles and mixtures thereof, and subsequently stoving the coating at a temperature between 150° and 300°C.

2. A process according to claim 1, in which said powder contains up to 50 percent by weight, based on the weight of the prepolymer and of said particles of a filler which is a flow inhibitor, spreading agent, pigment, fireproofing agent or a filler which improves the adhesion of the powder to metals.

3. A process according to claim 1, in which said powder comprises glass spheres of average size between 5 and 100 μ.

4. A process according to claim 1, in which said powder comprises mica particles of average size between 1 and 20 μ.

5. A process according to claim 1, in which said powder comprises from 30 to 70 percent by weight of the prepolymer.

6. A process according to claim 1, wherein D is derived from maleic, citraconic, itaconic, pyrocinchonic or dichloromaleic anhydride or a Diels-Alder reaction product thereof with an acyclic, alicyclic, or heterocyclic diene.

7. A process according to claim 1, wherein each of A and B, which may be the same or different, represents a linear or branched alkylene radical of less than 13 carbon atoms, a phenylene or cyclohexylene radical or a radical of the formula:

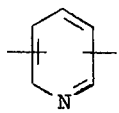, 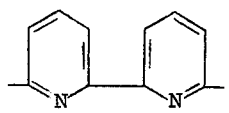,

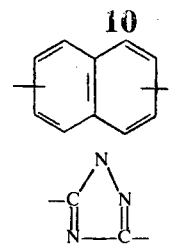

or

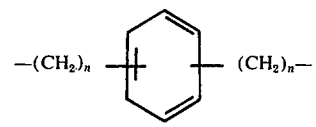

wherein $n$ represents 1, 2 or 3.

8. A process according to claim 1, wherein each of A and B, which may be the same or different, represents a radical comprising more than one phenylene or cyclohexylene radical joined together by a single bond, —O—, —S—, an alkylene group of 1 to 3 carbon atoms, —CO—, —SO$_2$—, —NR$_1$—, —N=N—, —CONH—, —COO—, —P(O)R$_1$—, —CONH—X—NHCO—,

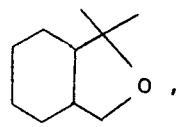, 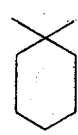, 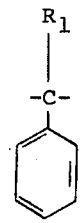,

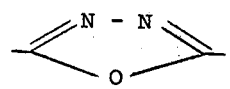

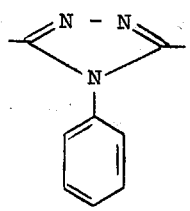

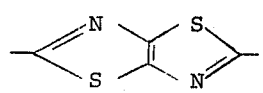

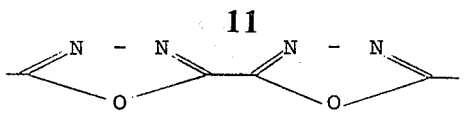

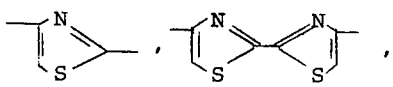

or

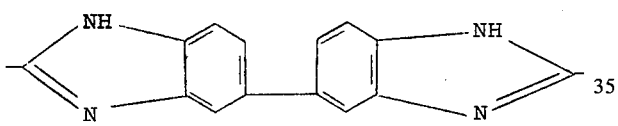

wherein $R_1$ represents a hydrogen atom, a lower alkyl radical with 1 to 4 carbon atoms, or a phenyl or cyclohexyl radical, and X represents an alkylene radical with less than 13 carbon atoms.

9. A process according to claim 1, wherein the prepolymer is the reaction product of N,N'-4,4'-diphenylmethanebis-maleimide and 4,4'-diaminodiphenylmethane in a molar ratio from 1.2:1 to 5:1.

10. A process according to claim 2, wherein the filler is present in said powder in an amount from 3 to 20 percent by weight based on the weight of the mixture of prepolymer and the particles selected from microspheres, mica particles and mixtures thereof.

11. A process according to claim 1, wherein the article has previously been treated with a polytrimellamideimide resin.

12. A process according to claim 11, wherein the trimellamide-imide from which the resin is derived is the reaction product of trimellitic anhydride with a compound of formula:

$$X - A_1 - X$$

in which $A_1$ represents a divalent radical containing at least one benzene nucleus and X represents a —NCO or —NHCOR group in which R represents an alkyl radical 1 too 6 carbon atoms or a phenyl or methylphenyl radical.

13. A process according to claim 12, wherein $A_1$ represents m-phenylene, p-phenylene, p,p'-diphenylene or

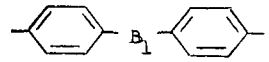

radical, in which $B_1$ represents —O—, —CH$_2$—, —C(CH$_3$)$_2$— or —SO$_2$—.

14. A process for coating an article which comprises spraying the article, which is heated to a temperature above the softening point of the prepolymer, with a fluidizable powder in the form of particles of dimensions between 5 and 200 μ consisting of a mixture comprising:

a. 5 to 95 percent by weight of a prepolymer obtained by heating at between 50° and 250°C., an N,N'-bisimide of an unsaturated dicarboxylic acid of general formula:

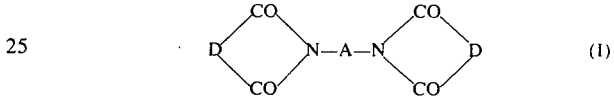

in which D represents a divalent radical containing a carboncarbon double bond and A represents a divalent radical containing 2 to 30 carbon atoms, and a di-primary diamine of general formula:

$$H_2N - B - NH_2 \qquad (II)$$

in which B represents a divalent radical containing 2 to 30 carbon atoms, and b. 95 to 5 percent by weight of particles selected from glass micro-spheres, mica particles and mixtures thereof, and subsequently stoving the coating at a temperature between 150° and 300°C.

15. A process according to claim 14, wherein the powder has a particle size not greater than 80 μ.

16. A process according to claim 14 wherein the article has previously been treated with a polytrimellamideimide resin.

17. A process according to claim 16 wherein the trimellamide-imide from which the resin is derived is the reaction product of trimellitic anhydride with a compound of formula:

$$X - A_1 - X$$

in which $A_1$ represents a divalent radical containing at least one benzene nucleus and X represents a —NCO or —NHCOR group in which R represents an alkyl radical of 1 to 6 carbon atoms or a phenyl or methylphenyl radical.

18. A process according to claim 17 wherein $A_1$ represents m-phenylene, p-phenylene, p,p'-diphenylene or

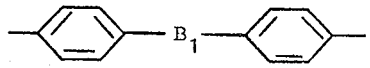

radical, in which $B_1$ represents —O—, —CH$_2$—, —C(CH$_3$)$_2$— or —SO$_2$—.

19. A process according to claim 14 wherein the said powder contains up to 50 percent by weight, based on the weight of the prepolymer and of said particles of a filler which is a flow inhibitor, spreading agent, pigment, fireproofing agent or a filler which improves the adhesion of the powder to metals.

20. A process according to claim 14 wherein the said powder comprises glass spheres of average size between 5 and 100 μ.

21. A process according to claim 14 wherein the said powder comprises mica particles of average size between 1 and 20 μ.

22. A process according to claim 14 wherein the said powder comprises from 30 to 70 percent by weight of the prepolymer.

23. A process according to claim 14 wherein D is derived from maleic, citraconic, itaconic, pyrocinchonic or dichloromaleic anhydride or a Diels-Alder reaction product thereof with an acyclic, alicyclic, or heterocyclic diene.

24. A process according to claim 14 wherein each of A and B, which may be the same or different, represents a linear or branched alkylene radical of less than 13 carbon atoms, a phenylene or cyclohexylene radical or a radical of the formula:

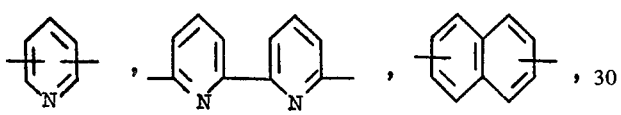

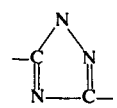

or

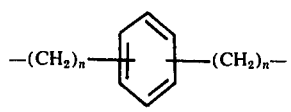

wherein n represents 1, 2 or 3.

25. A process according to claim 14 wherein each of A and B, which may be the same or different, represents a radical comprising more than one phenylene or cyclohexylene radical joined together by a single bond, —O—, —S—, an alkylene groupp of 1 to 3 carbon atoms, —CO—, —SO$_2$—, —NR$_1$—, —N=N—, —CONH—, —COO—, —P(O)R$_1$—, —CONH—X—NHCO—,

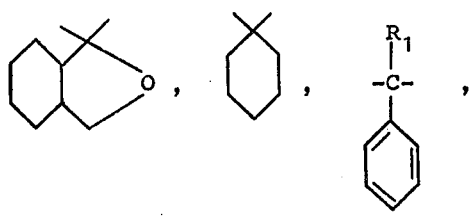

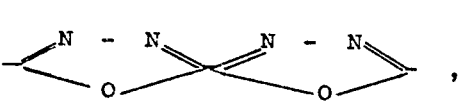

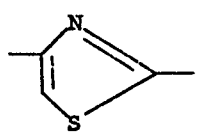

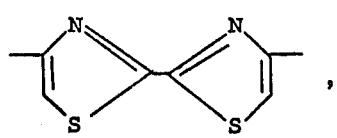

or

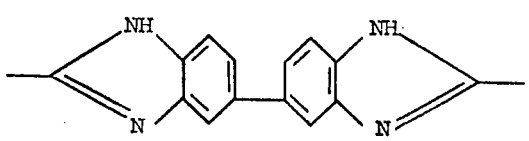

wherein $R_1$ represents a hydrogen atom, a lower alkyl radical with 1 to 4 carbon atoms, or a phenyl or cyclohexyl radical, and X represents an alkylene radical with less than 13 carbon atoms.

26. A process according to claim 14 wherein the prepolymer is the reaction product of N,N'—4,4'-diphenylmethanebis-maleimide and 4,4'-diaminodiphenylmethane in a molar ratio from 1.2:1 to 5:1.

27. A process according to claim 19 wherein the filler is present in said powder in an amount from 3 to 20 percent by weight based on the weight of the mixture of prepolymer and the particles selected from glass microspheres, mica particles and mixtures thereof.

* * * * *